United States Patent
Landström et al.

(10) Patent No.: US 8,385,931 B2
(45) Date of Patent: Feb. 26, 2013

(54) METHODS AND ARRANGEMENTS FOR ALLOCATING SCHEDULING REQUEST RESOURCES IN A WIRELESS COMMUNICATION SYSTEM

(75) Inventors: Sara Landström, Luleå (SE); Hans Hannu, Luleå (SE); Mårten Ericson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/386,978

(22) PCT Filed: Aug. 31, 2009

(86) PCT No.: PCT/SE2009/050981
§ 371 (c)(1),
(2), (4) Date: Jan. 25, 2012

(87) PCT Pub. No.: WO2011/025426
PCT Pub. Date: Mar. 3, 2011

(65) Prior Publication Data
US 2012/0122465 A1    May 17, 2012

(51) Int. Cl.
*H04W 72/00* (2009.01)
(52) U.S. Cl. ............... 455/450; 455/509; 455/452.1; 455/452.2; 370/341; 370/329; 370/335; 370/252
(58) Field of Classification Search ............... 455/450, 455/509, 452.1, 452.2; 370/329, 335, 252, 370/341
See application file for complete search history.

(56) References Cited

U.S. PATENT DOCUMENTS

| 2009/0175159 A1 | 7/2009 | Bertrand et al. | |
|---|---|---|---|
| 2009/0274107 A1* | 11/2009 | Park et al. | 370/329 |
| 2010/0046451 A1* | 2/2010 | Tada et al. | 370/329 |
| 2010/0142457 A1* | 6/2010 | Chun et al. | 370/329 |
| 2011/0194502 A1* | 8/2011 | Sung et al. | 370/329 |

FOREIGN PATENT DOCUMENTS

| EP | 1 202 495 A2 | 5/2002 |
|---|---|---|
| EP | 1 865 737 A1 | 12/2007 |
| WO | WO 2009/103183 A1 | 8/2009 |
| WO | WO 2009/103183 A1 | 8/2009 |

OTHER PUBLICATIONS

International Search Report, PCT Application No. PCT/SE2009/050981, May 11, 2010.

(Continued)

*Primary Examiner* — Kwasi Karikari
(74) *Attorney, Agent, or Firm* — Myers Bigel Sibley & Sajovec, P.A.

(57) ABSTRACT

Method and arrangement in a base station for allocating scheduling request resources to a user equipment. The method and arrangement comprises receiving a bearer setup message from the user equipment and sending a first instruction comprising a first scheduling request interval, to be used by the user equipment. Also, a scheduling request is received from the user equipment. The moment of time when data was generated at the user equipment and a periodicity of data generation at the user equipment are estimated. Further, a second scheduling request interval and scheduling request resources to be used by the user equipment is determined, based on the estimated periodicity and moment of data generation at the user equipment, and sent to the user equipment. In addition, a method and arrangement in a user equipment for assisting the base station for allocating scheduling request resources to the user equipment are described.

12 Claims, 8 Drawing Sheets

OTHER PUBLICATIONS

Samsung: "Further refinement on ACK/NACK multiplexing in TDD" 3GPP Draft; Draft CR-Further Consideration on Acknack Multiplexing in TDD, 3$^{RD}$ Generation Partnership Project (3GPP), Mobile Competence Centre; 650, Route Des Lucioles; F-06921 Sophia-Antipolis Cedex; France, no. Prague, Czech Republic; Nov. 4, 2008, XP050317383.

* cited by examiner

SR = Scheduling Request
G = Grant
T = Transmit
R = Retransmit,
N = NACK
A = ACK

METHODS AND ARRANGEMENTS FOR ALLOCATING SCHEDULING REQUEST RESOURCES IN A WIRELESS COMMUNICATION SYSTEM

CROSS REFERENCE TO RELATED APPLICATIONS

This application is a 35 U.S.C. §371 national stage application of PCT International Application No. PCT/SE2009/050981, filed on 31 Aug. 2009, the disclosure and content of which is incorporated by reference herein in its entirety. The above-referenced PCT International Application was published in the English language as International Publication No. WO 2011/025426 A1 on 3 Mar. 2011.

TECHNICAL FIELD

The present invention relates to a method and arrangement in a user equipment and a method and arrangement in a base station. More in particular, it relates to a mechanism for allocating scheduling request resources within a wireless communication system.

BACKGROUND

In Long Term Evolution (LTE), the scheduler is placed in the eNodeB and the Medium Access Control (MAC) layer. The scheduler assigns radio resources, also called Resource Blocks (RB), for the downlink (assignments) as well as for the uplink (grants) using the Physical Downlink Control Channel (PDCCH). Also, information concerning which transport format to use is comprised within the assignment and grant, respectively.

The radio downlink is the transmission path from a base station, e.g. an eNodeB to a terminal, or a User Equipment (UE) as the terminal also may be referred to as. The uplink is the inverse of a downlink, i.e. the transmission path from the terminal to the base station.

Figure 1:
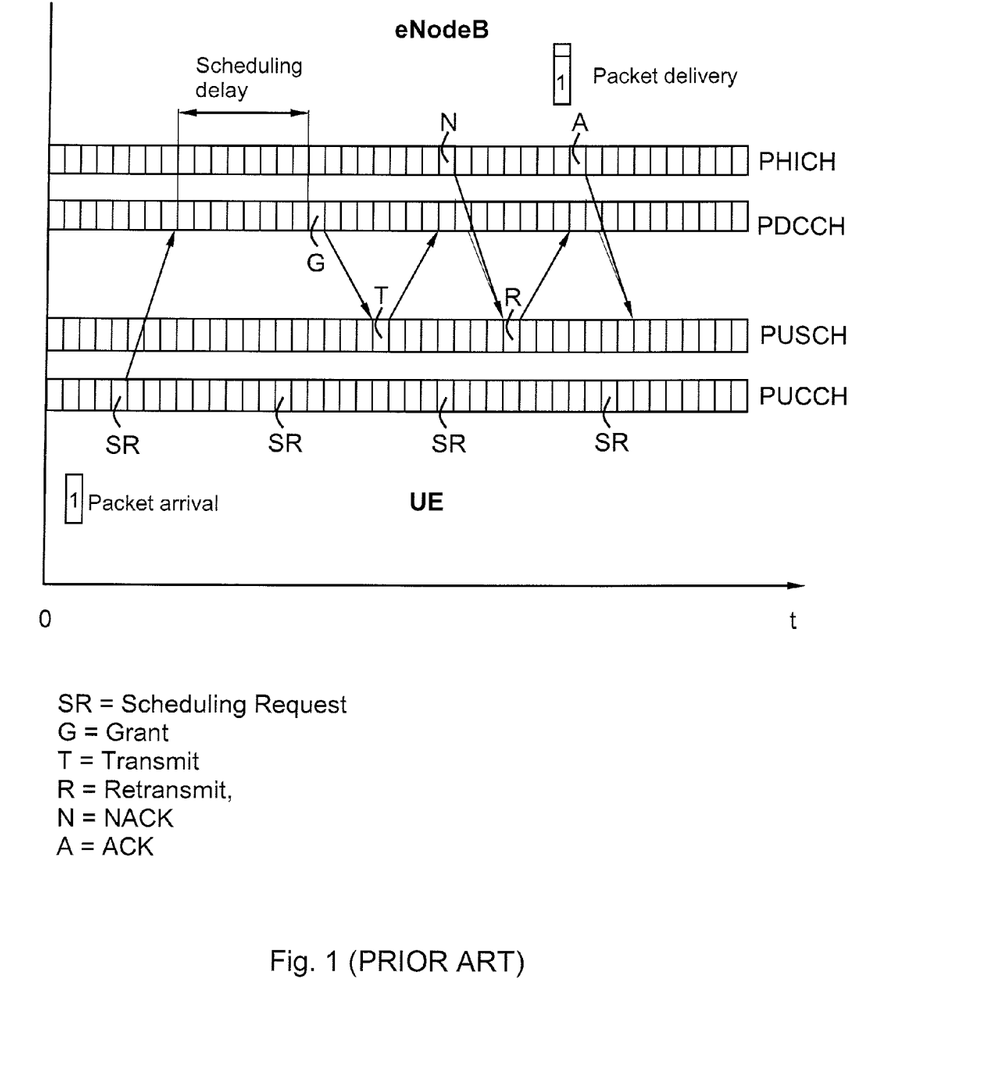
FIG. 1 is a flow chart illustrating scheduling communication according to prior art.

The terminal supplies the eNodeB with information about the data in its buffers using two mechanisms; a 1-bit scheduling request (SR) or buffer status reports (BSR). Buffer status reports are transmitted on a data channel such as Physical Uplink Shared Channel (PUSCH) mostly together with user data. Before access to the data channel is granted, scheduling requests are transmitted on a control channel such as e.g. Physical Uplink Control Channel (PUCCH) or Random Access Channel (RACH). If the terminal has a valid PUCCH resource for scheduling request configured in any transmission time interval (TTI) it sends a one bit scheduling request when the timing is right. Otherwise it initiates a random access procedure and cancels all pending scheduling requests. This process is illustrated in FIG. 1, which depicts prior art uplink scheduling.

The terminal is only allowed to use the PUCCH at pre-defined points in time determined by the Dedicated Scheduling Request (D-SR) interval. The delay between the actual generation time of a data packet such as e.g. a Voice over the Internet Protocol (VoIP) packet and the sending of the D-SR can thus become as large as the D-SR interval.

In the present context, the generation time is defined as the actual time when the data was put in the transmit buffer at the terminal and arrival time is defined as the time when the eNodeB receives the scheduling request.

If the network traffic within the wireless system consists mostly of VoIP packets, there will be many active terminals. Each terminal will get an uplink grant with an interval of around Z ms, where Z depends on the number of terminals. Until a terminal with data in its buffer gets a grant it will continue sending D-SRs on the PUCCH each time it can. Thus, at high load there will be many terminals which are actively using their D-SR resources. Although, there may be sufficient codes to assign to the terminals, the interference will rise when many users transmit simultaneously setting an upper limit to how may users that can actively send to maintain a low error rate on the PUCCH Scheduling Request resource. Therefore, increasing the D-SR interval to keep the PUCCH load reasonable may be necessary when there are many VoIP users. However, the larger the D-SR interval is, the less precise knowledge will be given to the eNodeB concerning the generation time of data in the terminal buffer.

When a voice user is listening instead of talking, the terminal sends Silence Insertion Descriptor (SID) frames with much larger spacing then the voice frames. Thus a smaller D-SR interval is possible as the terminal will need to send a D-SR less often.

When using service aware buffer estimation such as e.g. VoIP aware buffer estimation, just to mention an arbitrary example, the generation time is valuable. The VoIP aware buffer estimation algorithm moves between two states, SID and TALK and a state change should preferably occur when the codec switches between the corresponding states. The TALK state is a proactive buffer estimation state which guesses when the next voice frame will arrive and which size it will have, while the SID state is a passive state that expects Scheduling Requests when data has arrived for a user.

As voice frames arrive every 20 ms to the terminal buffer using for instance Adaptive Multi Rate (AMR), the better the algorithm knows the generation time, the more exact it will predict the buffer size.

The larger the D-SR interval is, the larger the difference between the generation time of the VoIP packet and the arrival time noted by the eNodeB may be. This makes it harder to accurately predict the buffer state and schedule delay-sensitive services, increasing the need for explicit signalling and decreasing the efficiency of the uplink assignments.

The VoIP aware buffer estimator use the arrival of the D-SR, though processing time is deducted, as the VoIP packet generation time, and this can be very different from the actual VoIP packet generation time. Furthermore, the eNodeB scheduler does not have correct packet delay information and may schedule the VoIP packet too late, especially in scenarios where the required VoIP delay is relatively short.

SUMMARY

It is the object to obviate at least some of the above disadvantages and provide an improved performance within a wireless communication system.

According to a first aspect, the object is achieved by a method in a base station for allocating scheduling request resources to a user equipment served by the base station. The base station and the user equipment are comprised within a wireless communication system. According to the present method a bearer setup message from the user equipment is received. Further, a first instruction comprising a first scheduling request interval, to be used by the user equipment is sent to the user equipment. The method also comprises receiving a scheduling request from the user equipment. Thereby, the moment of time when data was generated at a user equipment is estimated, based on the received scheduling request. Further, a periodicity of data generation at the user equipment is estimated. Also, a second scheduling request interval to be used by the user equipment is determined, based on the estimated periodicity of data generation at the user equipment. In addition, a scheduling request resource to be allocated to the user equipment is determined, based on the estimated moment of time when data was generated at a user equipment. Further, a second instruction comprising the determined second scheduling request interval and scheduling request resource is sent to the user equipment, in order to adjust the scheduling request resources of the user equipment.

According to a second aspect, the object is also achieved by an arrangement in a base station for allocating scheduling request resources to a user equipment served by the base station. The base station and the user equipment are comprised within a wireless communication system. The base station arrangement comprises a receiver. The receiver is adapted to receive a bearer setup message and a scheduling request from the user equipment. Further, the arrangement comprises a estimating unit. The estimating unit is adapted to estimate the moment of time when data was generated at a user equipment, based on the received scheduling request. Additionally, the arrangement also comprises an estimating unit. The estimating unit is adapted to estimate a periodicity of data generation at the user equipment. Furthermore, the arrangement also comprises a first determining unit. The first determining unit is adapted to determine a scheduling request interval to be used by the user equipment, based on the estimated periodicity of data generation at the user equipment. Additionally, the arrangement further comprises a second determining unit. The second determining unit is adapted to determine a scheduling request resource to be allocated to the user equipment, based on the estimated moment of time when data was generated at a user equipment. In further addition, the arrangement comprises a sending unit. The sending unit is adapted to send an instruction comprising the determined scheduling request interval and scheduling request resource to the user equipment, in order to adjust the scheduling request resources of the user equipment.

According to a third aspect, the object is also achieved by a method in a user equipment for assisting a base station in allocating scheduling request resources to the user equipment. The base station and the user equipment are comprised within a wireless communication system. The method comprises sending a bearer setup message to the base station. Also, a first instruction comprising a first scheduling request interval is received from the base station. Additionally, the method comprises adjusting the scheduling request interval, according to the received first instruction. Also, furthermore, a scheduling request is sent to the base station at the adjusted first scheduling request interval. In further addition, a second instruction comprising a second scheduling request interval and scheduling request resource is received in order to adjust the scheduling request interval and scheduling request resources of the user equipment. Thus, furthermore, the scheduling request interval and scheduling request resources are adjusted, according to the received second instruction.

According to a fourth aspect, the object is also achieved by an arrangement in a user equipment for assisting a base station in allocating scheduling request resources to the user equipment. The base station and the user equipment are comprised within a wireless communication system. The user equipment arrangement comprises a sender. The sender is adapted to send a bearer setup message to the base station. Furthermore, the arrangement also comprises a receiver. The receiver is adapted to receive an instruction comprising a scheduling request interval and scheduling request resource from the base station. In addition, the arrangement further comprises an adjustment unit. The adjustment unit is adapted to adjust the scheduling request interval and scheduling request resources, according to the received instruction.

By estimating the periodicity and generation time of data in the user equipment buffer, according to embodiments of the present methods and arrangements, it is possible to predict the user equipment buffer status. By using knowledge about the user equipments service related behaviour, it may be determined which state the user equipment is transmitting in and at what point in time the user equipment has data to send. This information is according to embodiments of the present methods and arrangements used for determining a scheduling request interval and scheduling request resources. Thus thanks to a short initial D-SR interval, an estimation of the data generation time may be performed. Based on that estimated data generation time and periodicity, a second D-SR interval may be determined, which second D-SR interval and scheduling request resources are synchronised with the data generation of the user equipment. Thereby better scheduling decisions and buffer estimates may be made.

The need for frequent explicit signalling related to buffer status, such as i.e., scheduling requests and buffer status reports, are also reduced. Thereby, as uplink radio resources are scheduled according to the predicted user equipment buffer status, less signalling has to be made between the base station to the user equipment.

Improving the knowledge of the packet generation time will improve the buffer status estimation and scheduling performance for delay sensitive services.

Further, the overall reduced signalling resulting from the present methods and arrangements render higher capacity and better coverage within the system. Thereby an improved performance in the wireless communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a base station and as a method and an arrangement in a user equipment, which may be put into practice in the embodiments described below. This invention may, however, be embodied in many different forms and may not be construed as limited to the embodiments set forth herein; rather, these embodiments are provided so that this disclosure will be thorough and complete, and will fully convey the scope of the invention to those skilled in the art. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 2:
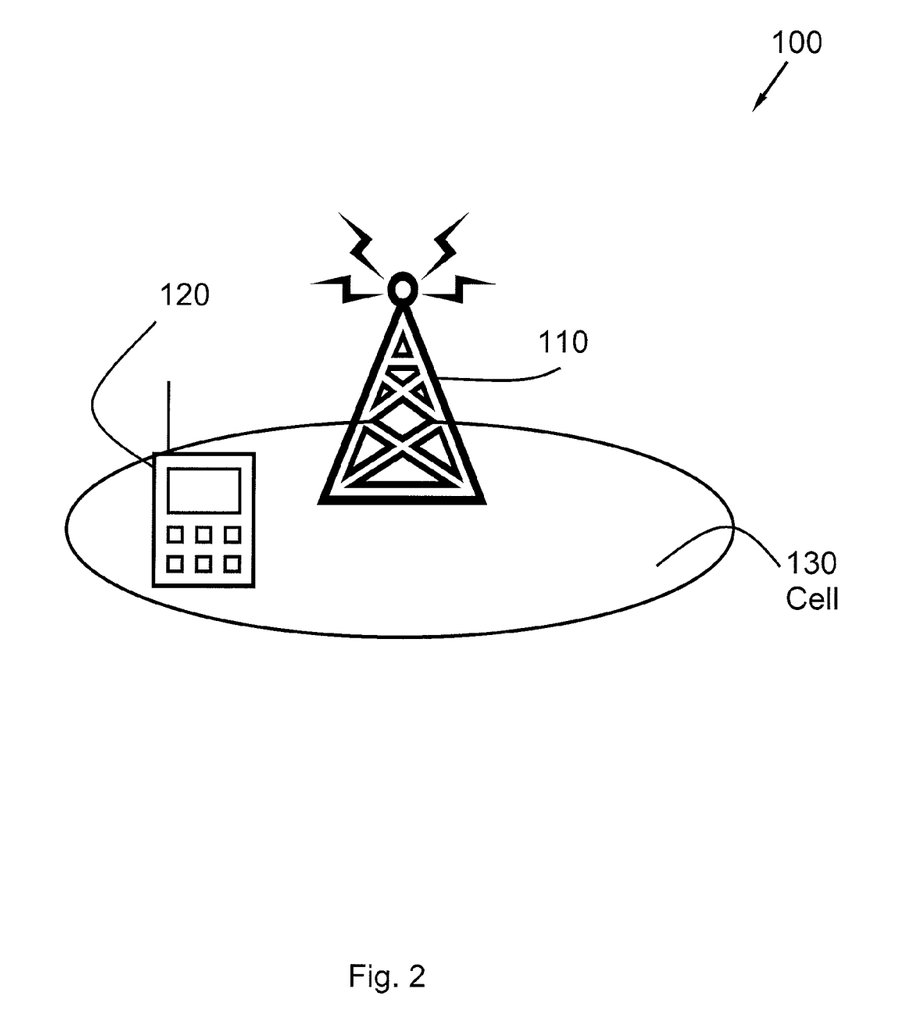
FIG. 2 is a schematic block diagram illustrating a wireless communication system.

FIG. 2 is a schematic illustration over a wireless communication system 100. The wireless communication system 100 comprises at least one base station 110 and is arranged to comprise at least one user equipment 120. The base station 110 may send and receive wireless signals to and from the user equipment 120 situated within the cell 130.

Although only one base station 110 is shown in FIG. 2, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipment 120 may be represented by and/or referred to as a wireless communication device, a wireless communication terminal, a mobile cellular telephone, a terminal, a Personal Communications Systems terminal, a Personal Digital Assistant (PDA), a laptop, computer or any other kind of device capable of wireless communication.

The wireless communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

However, in the exemplary embodiments in the subsequent description, the wireless communication system 100 is based on LTE.

The user equipment 120 may further communicate with other terminals not shown in FIG. 2, via the base station 110 comprised within the wireless communication system 100.

The user equipment 120 according to the present method and arrangement make use of the assigned D-SR when it has a data packet in its transmission buffer. By having a rather short D-SR interval, say X ms, in the beginning of the real time such as e.g. a VoIP session, say for the first Y ms, we can get a good estimate of the generation time with respect to the assigned D-SR interval. The difference would be at most X ms.

In this context, the expression scheduling request resource is used for the denominating the moments in time that are allocated to the user equipment 120 for sending a scheduling request to the base station over the PUCCH, i.e. the assigned D-SR. The expression scheduling request interval is herein used for denominating the period of time between each scheduling request resource, i.e. the D-SR interval.

For efficiency reasons the short scheduling request interval, or D-SR interval, may not be used for longer than Y ms, for example when the wireless communication system 100 is heavily trafficked. The information obtained about the generation time is used by the base station 110 to update the D-SR interval to have as short as possible difference to the generation time and at the same time the D-SR interval can be in the range of the codec frame interval without loss of performance.

The base station 110 is further adapted to modify the scheduling request configuration and schedule the uplink transmissions from the user equipment 120, to the base station 110. The scheduling request configuration is both to change the scheduling request interval and the actual PUCCH resource, in time. To clarify, the parameter SR configuration index may be changed. The table below shows how it may be interpreted. It both specifies the periodicity, which also may be referred to as the scheduling request interval, and a scheduling request subframe offset.

TABLE 1

UE-specific SR periodicity and subframe offset configuration

| SR configuration Index (SRI) | SR periodicity (ms) | SR subframe offset |
|---|---|---|
| 0-4 | 5 | SRI |
| 5-14 | 10 | SRI − 5 |
| 15-34 | 20 | SRI − 15 |
| 35-74 | 40 | SRI − 35 |
| 75-154 | 80 | SRI − 75 |
| 155 | OFF | N/A |

Figure 3A:
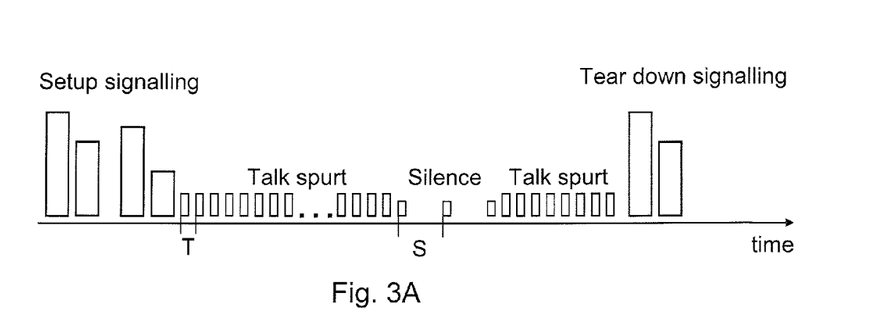
FIG. 3A is a combined flow chart and event diagram illustrating embodiments of method steps in a wireless communication system.
Figure 3B:
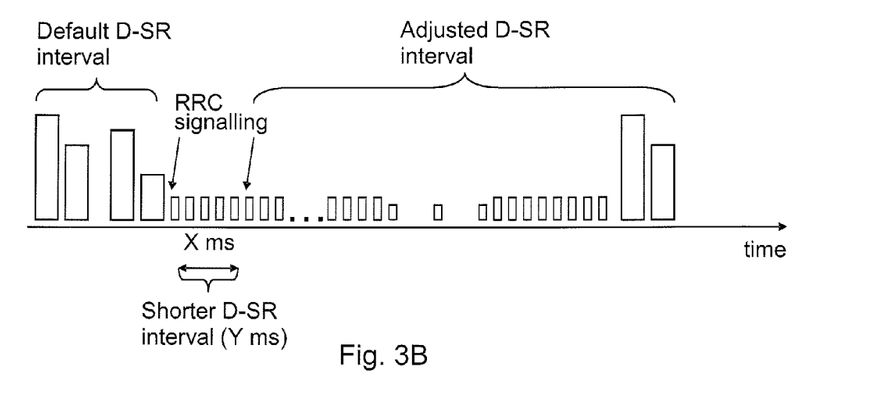
FIG. 3B is a combined flow chart and event diagram illustrating embodiments of method steps in a wireless communication system.
Figure 3C:
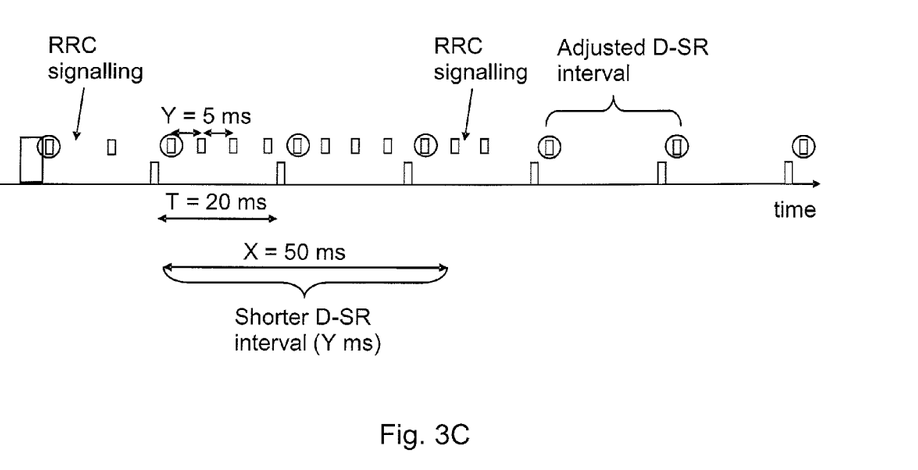
FIG. 3C is a combined flow chart and event diagram illustrating embodiments of method steps in a wireless communication system.

In order to grant a particular user equipment 120 access to a particular uplink resource, a grant is generated and sent from the base station 110 to that particular user equipment 120, based on the estimated data generation time and predicted buffer state of the user equipment buffer, as will be further explained and discussed more in detail in connection with the presentation of FIG. 3A-3C.

FIG. 3A illustrates an example embodiment of a VoIP session according to some embodiments of the present methods and arrangements.

A voice codec outputs a frame periodically during talk periods, for example the adaptive multi-rate (AMR) codec produces a frame every T=20 ms. The periodicity of the frames are kept even during silence although the output from the codec during silence is increased to:

$$S = i \cdot T \ [ms]$$

Where S is the time between each frame in silence, or silence descriptor (SID) mode, as it also may be referred to. As a non-limiting example, it may be mentioned that in the case of AMR, i=8 and T=20 ms which render S=160 ms. Hence, when a talk spurt ends a new talk spurt is started with an offset of k·T ms from the previous talk spurt. Here, k is an arbitrary integer variable. The value of k depends on when the person at the user equipment 120 starts to speak again.

The time line of an exemplary VoIP session is illustrated in FIG. 3A. First, the call session is setup via signalling, then the VoIP packets are generated during the talk spurts and silence descriptors (SID) are sent during moments of silence. Then the call is terminated via teardown signalling.

FIG. 3B illustrates an example embodiment of D-SR interval signalling within a VoIP session according to some embodiments of the present methods and arrangements.

Prior to the session setup signalling at least one bearer is setup to transfer the signalling and the voice traffic over the wireless communication system 100. Based on the information provided in the bearer setup concerning the relevant service, i.e. if it is a real time service such as VoIP, the D-SR interval may be set. The D-SR interval can be short from start if the PUCCH load allows for it. Alternatively, it can be changed as the talk spurt starts. The latter is described in FIG. 3B. After Y ms the shorter D-SR interval is changed to a longer D-SR interval, but now adjusted to fit the VoIP packet generation time, such that they are synchronized.

According to some embodiments of the present methods and arrangements, the D-SR interval is changed as the session progress. The Radio Resource Control (RRC) may be used to carry the signalling to alter the D-SR interval. The RRC signalling is sent over the physical downlink control channel (PDSCH) and physical uplink shared channel (PUSCH) respectively. In favourable conditions this may only take one Transmission Time Interval (TTI). The user equipment 120 may process the RRC procedure in e.g. 15 ms, according to some embodiments.

Hence, the change of D-SR interval may be done within one voice frame, according to some embodiments. However, according to some embodiments, the change of D-SR interval may be performed within the interval of two frames.

FIG. 3C illustrates an example scenario where the D-SR interval is changed to fit to the VoIP packet generation time during a VoIP session.

As previously described, the difference between the VoIP packet generation time is at most the interval of the D-SR, according to the present embodiments.

The D-SR interval may be larger during talk periods, as the VoIP aware estimator algorithm does not use the D-SR in TALK state more than for finding the generation time initially. In SID state, the D-SR interval may be kept short since a D-SR is required to trigger a grant and detect transitions to TALK state.

It is to be noted that the present methods and arrangements are not by any means limited to be performed on voice frame periods of 20 ms within AMR. Further, according to some embodiments frame bundling may be used, which increase the VoIP packet generation time in accordance with the bundling.

Further, although the codec has a negligible drift in the frame output, the user equipment 120 processing of other events might cause a spread in the packet generation time. Hence, according to some embodiments, the D-SR adjustment procedure may be repeated at certain intervals. However, overall system resource aspects are to be taken into account.

Figure 4:
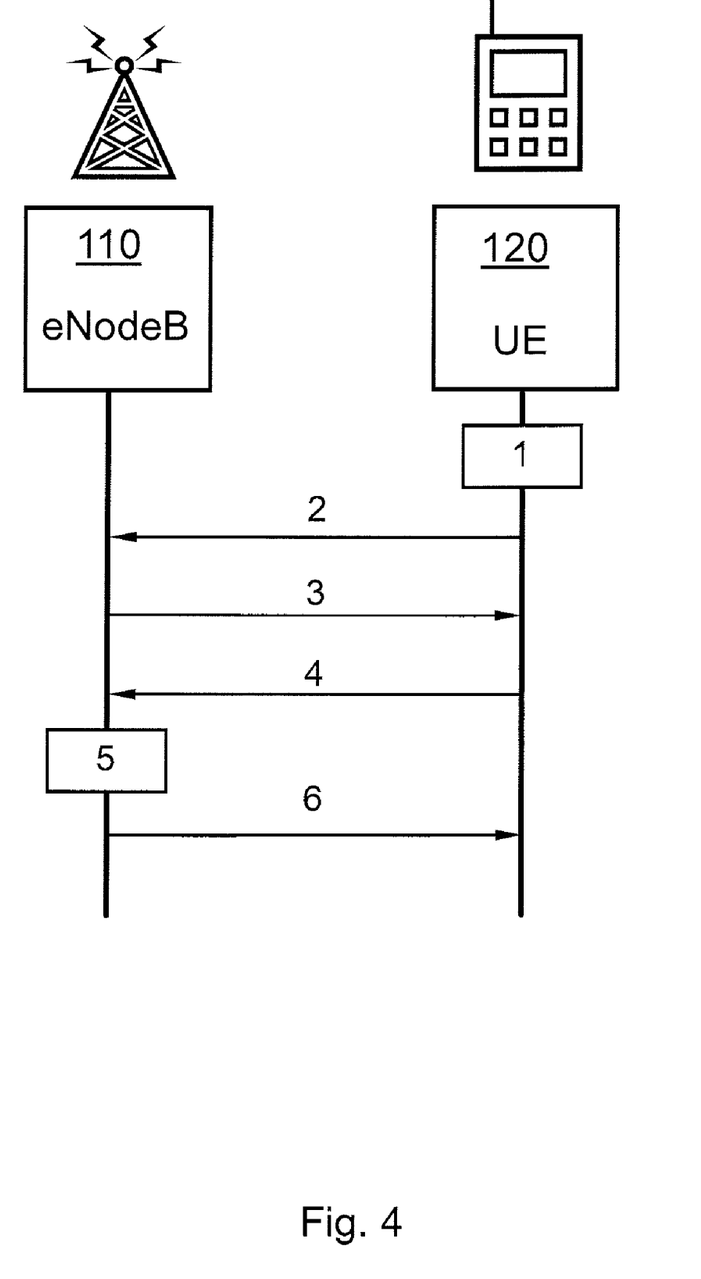
FIG. 4 is a combined flow chart and event diagram illustrating embodiments of method steps in a wireless communication system.

FIG. 4 is a combined flow chart and event diagram illustrating embodiments of method steps in a wireless communication system.

When using VoIP in AMR mode, a voice frame is generated every 20 ms and a silence insertion descriptor (SID) frame every 160 ms. Thus the frames will arrive with regular spacing, therefore it may not be necessary to run the present method and update the determined data generation time and adjust the scheduling request interval more than once in a while.

1
Data is generated and stored in the buffer of the user equipment 120.

2
A bearer setup message is sent from the user equipment 120 to the base station 110, for the purpose of setting up at least one data channel, transmitting data from the user equipment 120 to the base station 110, or e.g. to another end user via the base station 110.

3
The base station 110 receives the bearer setup message from the user equipment 120 and determines a scheduling request interval to be used by the user equipment 120 and sends an instruction comprising the determined scheduling request interval to the user equipment 120. Thus the user equipment 120 has permission to send a scheduling request over the PUCCH i.e. at the moments of time when the base station 110 has scheduled resources on the PUCCH for sending scheduling requests to the base station 120.

4
The user equipment 120 sends a scheduling request to the base station 110. The user equipment 120 is triggered to send the scheduling request to the base station 110 when data to be sent has been generated at the user equipment buffer.

5
As the base station 110 receives the scheduling request from the user equipment 120, the base station 110 can estimate the moment of time when data was generated at a user equipment 120, based on the received scheduling request.

By allowing a short initial D-SR interval according to the present methods, the data generation time may be estimated to the time when the first scheduling request is received from the user equipment 120. The time error is less than or equal to the initial D-SR interval.

Also, as the base station 110 knows which service and can estimate the service mode the user equipment 120 at the moment is using, e.g. VoIP in AMR TALK mode, the base station 110 also may estimate that data will be generated at the user equipment 120 every 20 ms at least until a service mode change occur, i.e. the user swap from TALK mode into SID mode, when the data generation periodicity thus changes.

Having estimated the periodicity of data generation at the user equipment 120 and the moment of time when data was generated at a user equipment 120, the base station 110 may determine a second scheduling request interval and scheduling request resource to be used by the user equipment 120, which second scheduling request interval and scheduling request resource are synchronized with the predicted recurrent data generation moments at the user equipment 120.

6
A new instruction is sent to the user equipment 120 comprising the determined second scheduling request interval and scheduling request resource, in order to adjust the scheduling request interval and scheduling request resources of the user equipment 120.

In this illustrative example, only one scheduling request is sent from the user equipment 120 to the base station 110 before the base station 110 sends a second instruction comprising the second scheduling request interval and scheduling request resources to be used by the user equipment 120. However, this is just an arbitrary example for illustrative purpose, it may be that the user equipment 120 send a plurality of scheduling requests on the first scheduling request interval before the second instruction comprising the second scheduling request interval and scheduling request resources to be used by the user equipment 120 is received from the base station 110.

Figure 5:
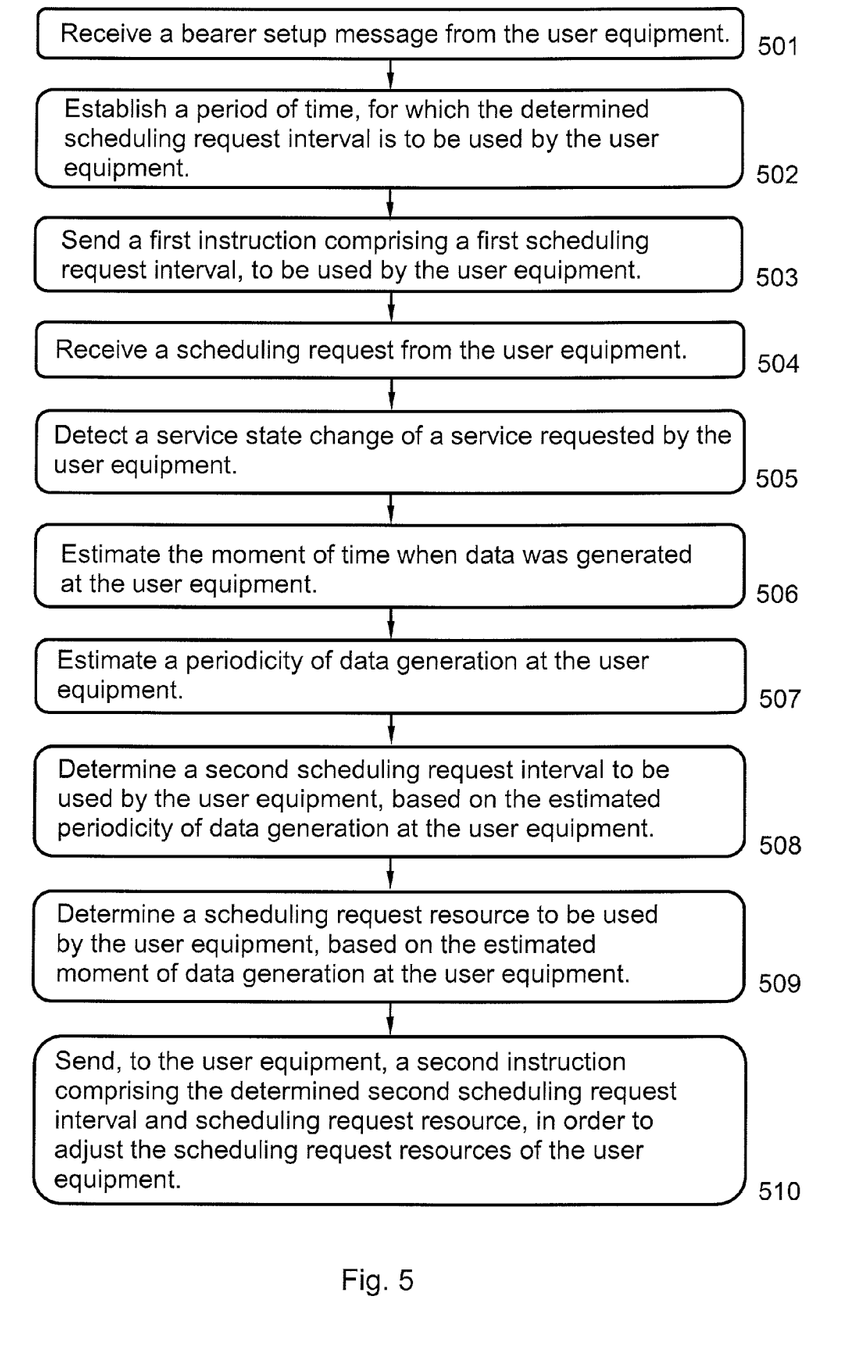
FIG. 5 is a flow chart illustrating embodiments of method steps in a base station.

FIG. 5 is a flow chart illustrating embodiments of method steps 501-509 performed in a base station 110. The method aims allocating scheduling request resources to a user equipment 120 served by the base station 110. The scheduling request resources may comprise e.g. a dedicated scheduling request interval and a time slot to be used in the PUCCH by the user equipment 120 when sending scheduling requests to the base station 110. The base station 110 and the user equipment 120 are comprised within a wireless communication system 100.

The user equipment 120 may further comprise a buffer arranged to buffer frames comprising data. The user equipment 120 is arranged to send a scheduling request to the base station 110 only at certain dedicated moments in time, which are separated by a predetermined time interval and to send data only after firstly having sent a scheduling request and being scheduled resources by the base station 110.

The requested service may according to some embodiments comprise different states. The different states may comprise e.g. a talk state and a silence state when using VoIP.

To appropriately allocate scheduling request resources to the user equipment 120, the method may comprise a number of method steps 501-510.

It is however to be noted that some of the described method steps 501-510 are optional and only comprised within some embodiments. Further, it is to be noted that the method steps 501-510 may be performed in any arbitrary chronological order and that some of them, e.g. step 507 and step 508, or even all steps may be performed simultaneously or in an altered, arbitrarily rearranged, decomposed or even completely reversed chronological order. The method may comprise the following steps:

Step 501

A bearer setup message is received from the user equipment 120.

Step 502

This step is optional and may only be performed within some embodiments.

A period of time, for which the first scheduling request interval is to be used by the user equipment 120 may be established.

Step 503

A first instruction comprising a first scheduling request interval, to be used by the user equipment 120 is sent to the user equipment 120.

Optionally, the first instruction further may comprise the period of time for which the first scheduling request interval is to be used by the user equipment 120.

The first scheduling request interval is shorter than the period of time for which the first scheduling request interval is to be used, which period of time may depend e.g. on the service and/or service mode.

Step 504

A scheduling request is received from the user equipment 120.

Step 505

This step is optional and may only be performed within some embodiments.

A service state change of a service requested by the user equipment 120 may be detected, such that the base station 110 is aware of which service and which service state to be used.

The detection of service state change may be performed by analyzing the data received from the user equipment 120. If small packets of data are received, on a further apart interval, such as on a e.g. 160 ms interval, the user equipment 120 may be considered to send in SID mode, while larger data packets received more frequently, such as e.g. every 20 ms, may indicate that the user equipment 120 transmit in TALK mode.

Step 506

The moment of time when data was generated at a user equipment 120 is estimated, based on the received scheduling request.

Step 507

A periodicity of data generation at the user equipment 120 is estimated.

The periodicity of data generation at the user equipment 120 may optionally be based on a combination of the received scheduling request, received data and bearer setup signalling received from the user equipment 120, according to some embodiments.

According to some embodiments, the periodicity of data generation may be estimated by analyzing the amount of received data from the user equipment 120, e.g. counting voice data frames in a received data packet. However, according to some embodiments, the received bearer setup signalling may be used if the service could be expected to have a predictable periodicity.

Step 508

A second scheduling request interval to be used by the user equipment 120 is determined, based on the estimated periodicity of data generation at the user equipment 120.

The second scheduling request interval may be determined such that it is synchronized with the estimated periodicity of data generation at the user equipment 120. Thereby a scheduling request may be allocated for the user equipment 120 just as data has been estimated to be generated.

The first scheduling request interval may be shorter than the second scheduling request interval, according to some embodiments.

This step may also comprise to identify which service the user equipment 120 requests and determining the second scheduling request interval based on that identified service, according to some embodiments.

According to some embodiments may the second scheduling request interval be based also on the detected service state.

When the service states comprises e.g. a talk state and a silent state, the second scheduling request interval may be determined to be longer during talk state and shorter during silent state.

Step 509

A scheduling request resource to be allocated to the user equipment 120 is determined, based on the estimated moment of time when data was generated at a user equipment 120.

Thus scheduling request resources such as which particular time slot in PUCCH to be used in association with sending future scheduling requests is determined in this step.

Step 510

A second instruction comprising the determined second scheduling request interval and scheduling request resource is sent to the user equipment 120, in order to adjust the scheduling request resources of the user equipment 120.

Figure 6:
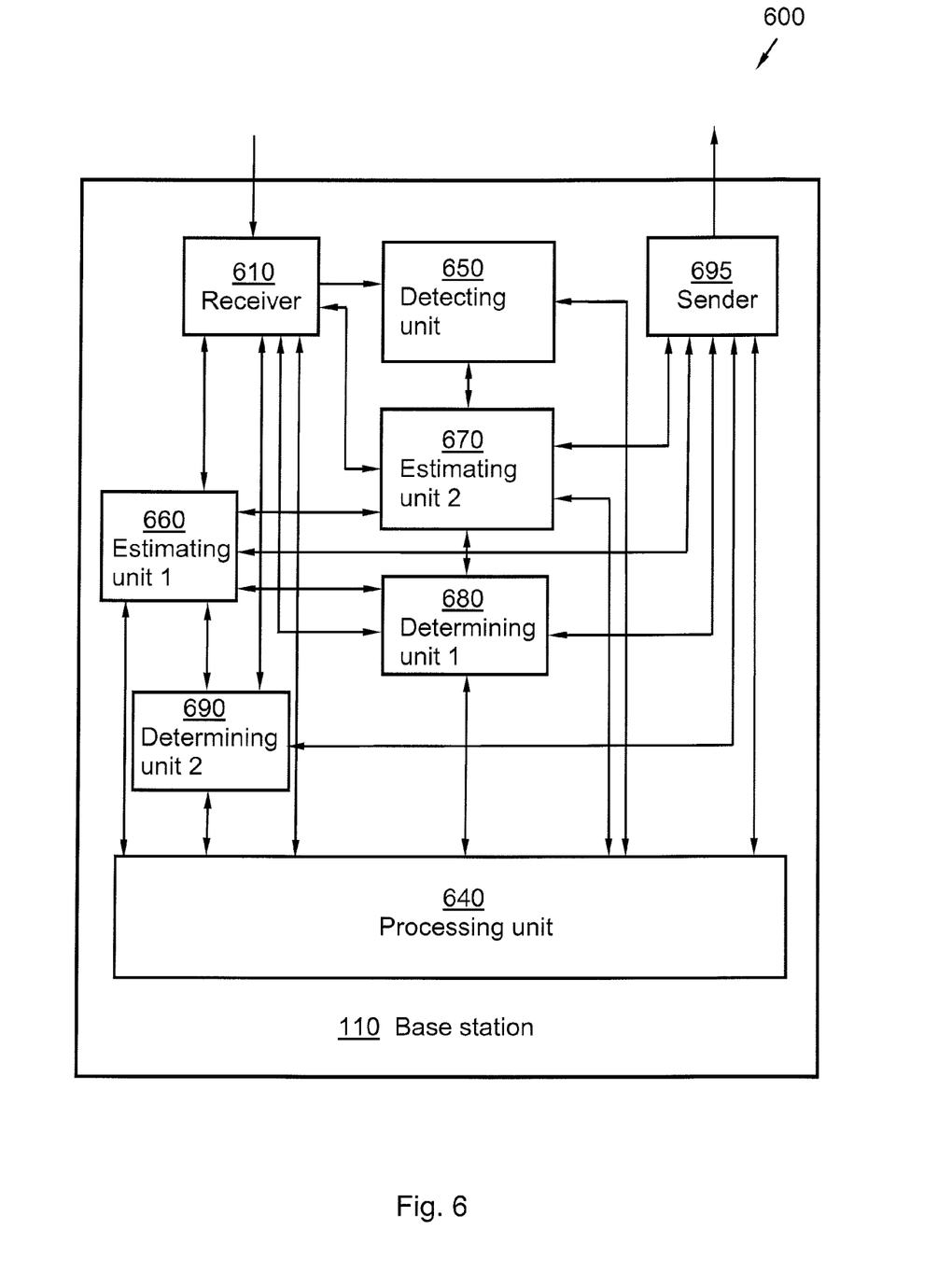
FIG. 6 is a block diagram illustrating embodiments of an arrangement in a base station.

FIG. 6 is a block diagram illustrating embodiments of an arrangement 600 situated in a base station 110. The arrangement 600 is configured to perform the method steps 501-510 for allocating scheduling request resources to a user equipment 120. The base station 110 and the user equipment 120 are comprised within a wireless communication system 100.

For the sake of clarity, any internal electronics of the arrangement 600, not completely necessary for understanding the present method has been omitted from FIG. 6.

The arrangement 600 comprises a receiver 610. The receiver 610 is adapted to receive a bearer setup message and a scheduling request from the user equipment 120. Also, the arrangement 600 comprises a first estimating unit 660. The first estimating unit 660 is adapted to estimate the moment of time when data was generated at a user equipment 120, based on the received scheduling request. In addition, the arrangement 600 comprises a second estimating unit 670. The second estimating unit 670 is adapted to estimate a periodicity of data generation at the user equipment 120. Furthermore, the arrangement 600 also comprises a first determining unit 680. The first determining unit 680 is adapted to determine a scheduling request interval to be used by the user equipment 120, based on the estimated periodicity of data generation at the user equipment 120. Also, the arrangement 600 further comprises a second determining unit 690. The second determining unit 690 is adapted to determine scheduling request resources to be used by the user equipment 120, based on the estimated moment of time when data was generated at a user equipment 120. In further addition, the arrangement 600 also comprises a sending unit 695. The sending unit 695 is adapted to send an instruction comprising the determined scheduling request interval and scheduling request resource to the user equipment 120, in order to adjust the scheduling request interval of the user equipment 120.

The arrangement 600 may optionally further comprise a detecting unit 650. The detecting unit 650 may be adapted to detect a service state change of a service, such that the base station 110 is aware of which service and which service state to be used.

The arrangement 600 may according to some embodiments further comprise a processing unit 640. The processing unit 640 may be represented by e.g. a Central Processing Unit (CPU), a processor, a microprocessor, or other processing logic that may interpret and execute instructions. The processing unit 640 may perform all data processing functions for inputting, outputting, and processing of data including data buffering and device control functions, such as call processing control, user interface control, or the like.

It is to be noted that the described units 610-695 comprised within the arrangement 600 may be regarded as separate logical entities, but not with necessity as separate physical entities. Any, some or all of the units 610-695 may be comprised or co-arranged within the same physical unit. However, in order to facilitate the understanding of the functionality of the arrangement 600, the comprised units 610-695 are illustrated as separate units in FIG. 6.

Thus the sending unit 695 and e.g. the receiving unit 610 may, according to some embodiments, be comprised within one physical unit, a transceiver, which may comprise a transmitter circuit and a receiver circuit, which respectively transmits outgoing radio frequency signals to base station 110 and receives incoming radio frequency signals from the base station 110 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the Base Station 110

The method steps 501-510 in the base station 110 may be implemented through one or more processor units 640 in the base station 110, together with computer program code for performing the functions of the present method steps 501-510. Thus a computer program product, comprising instructions for performing the method steps 501-510 in the base station 110 may allocate scheduling request resources to the user equipment 120 served by the base station 110.

The computer program product mentioned above may be provided for instance in the form of a data carrier carrying computer program code for performing the method steps according to the present solution when being loaded into the processor unit 640. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 501-510 may be used for implementing the previously described method in the base station 110 for allocating scheduling request resources to the user equipment 120, when the computer program product is run on a processing unit 640 comprised within the base station 110.

Figure 7:
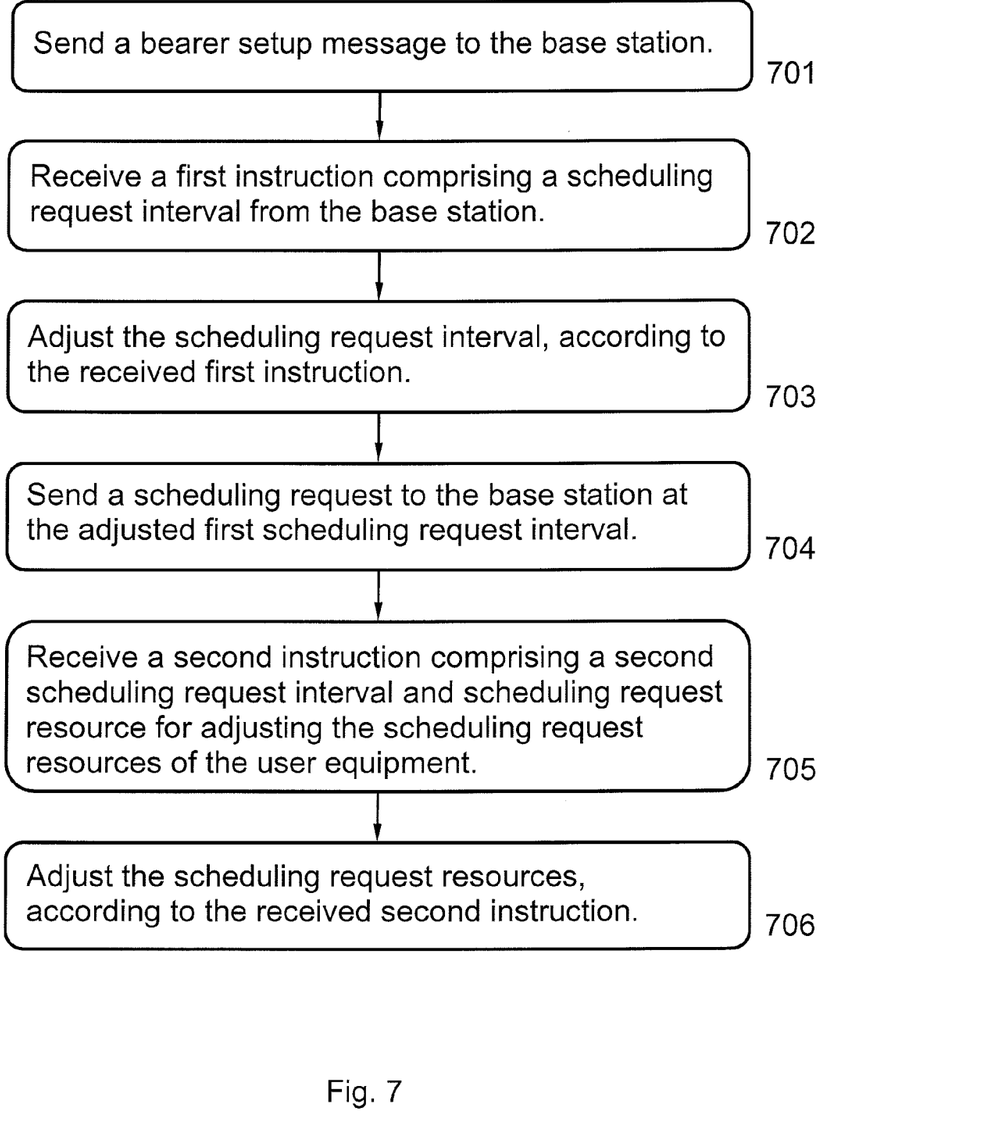
FIG. 7 is a flow chart illustrating embodiments of method steps in a user equipment.

FIG. 7 is a flow chart illustrating embodiments of method steps 701-706 performed in a user equipment 120. The method aims at assisting a base station 110 in allocating scheduling request resources to the user equipment 120. The base station 110 and the user equipment 120 are comprised within a wireless communication system 100.

The user equipment 120 is arranged to send a scheduling request to the base station 110 only at certain dedicated moments in time, which are separated by a predetermined time interval and to send data only after firstly having sent a scheduling request and being scheduled resources by the base station 110. The requested service may according to some embodiments comprise different states, such as e.g. a talk state and a silence state.

To appropriately assist the base station 110 in allocating scheduling request resources to the user equipment 120, the method may comprise a number of method steps 701-706.

It is however to be noted that some of the described method steps 701-706 are optional and only comprised within some embodiments. Further, it is to be noted that the method steps 701-706 may be performed in any arbitrary chronological order and that some of them, e.g. step 704 and step 705, or even all steps may be performed simultaneously or in an altered, arbitrarily rearranged, decomposed or even completely reversed chronological order. The method may comprise the following steps:

Step 701

A bearer setup message is sent to the base station 110.

Step 702

A first instruction comprising a first scheduling request interval is received from the base station 110.

The first scheduling request interval received from the base station 110, may according to some embodiments be used only for a certain period of time. The certain period of time for which the first scheduling request interval is to be used by the user equipment 120 may according to some embodiments be received from the base station 110.

Step 703

The scheduling request interval is adjusted according to the received first instruction.

Step 704

A scheduling request is sent to the base station 110 at the adjusted first scheduling request interval, i.e. at the dedicated moment in time when the user equipment 120 is allowed by the base station 110 to send a scheduling request over a control channel, such as e.g. PUCCH.

Step 705

A second instruction comprising a second scheduling request interval and scheduling request resource is received. The second scheduling request interval and the scheduling request resource is used in order to adjust the scheduling request resources of the user equipment 120.

Step 706

The scheduling request interval and scheduling request resources are adjusted, according to the second scheduling request interval and scheduling request resource comprised in the received second instruction.

Figure 8:
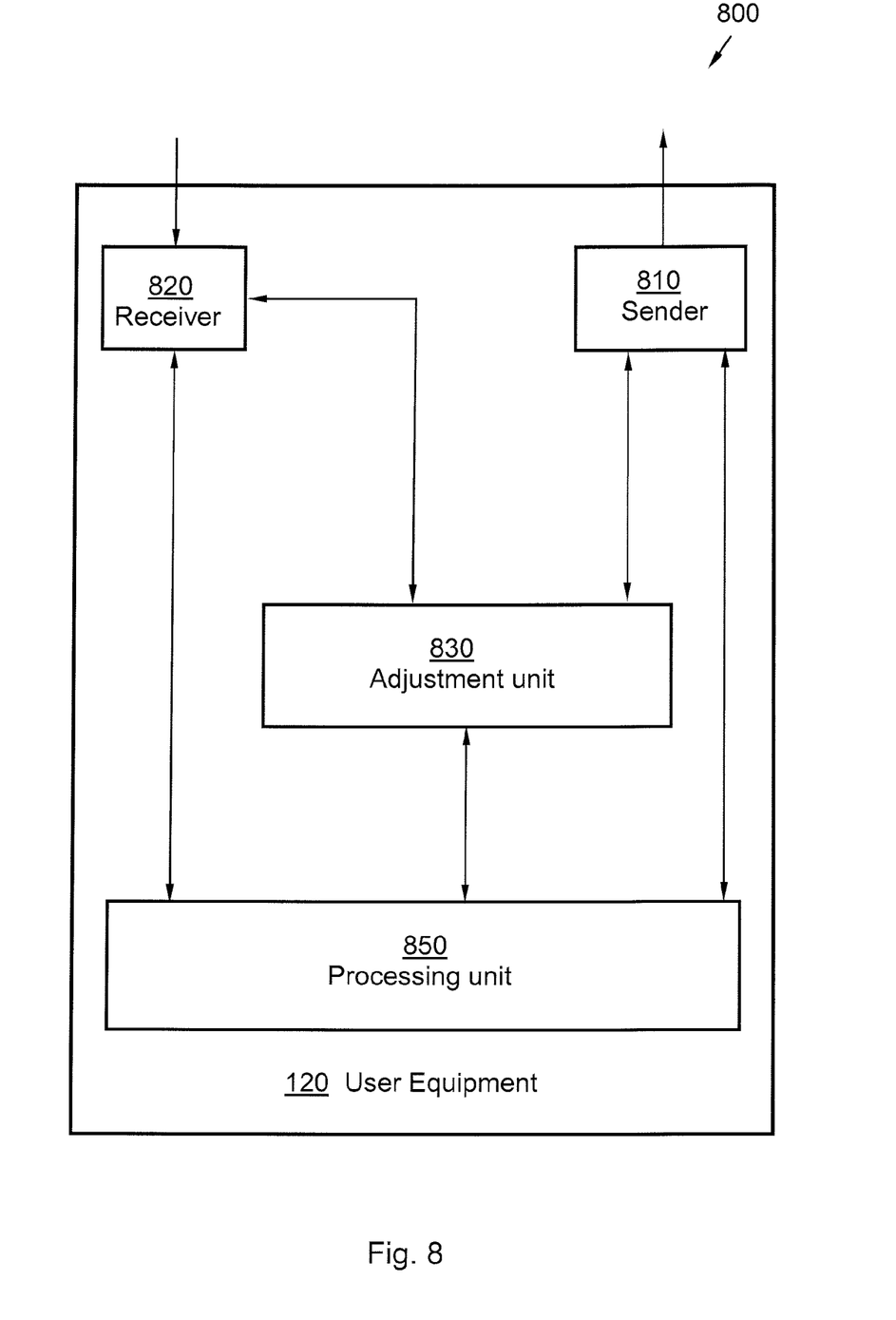
FIG. 8 is a block diagram illustrating embodiments of an arrangement in a user equipment.

FIG. 8 is a block diagram illustrating embodiments of an arrangement 800 situated in a user equipment 120. The arrangement 800 is configured to perform the method steps 701-706 for assisting a base station 110 in allocating scheduling request resources to the user equipment 120. The base station 110 and the user equipment 120 are comprised within a wireless communication system 100.

For the sake of clarity, any internal electronics of the arrangement 800, not completely necessary for understanding the present method has been omitted from FIG. 8.

The arrangement 800 comprises a sender 810. The sender 810 is adapted to send a bearer setup message to the base station 110. The arrangement 800 also comprises a receiver 820. The receiver 820 is adapted to receive an instruction comprising a scheduling request interval and a scheduling request resource from the base station 110. In addition, the arrangement 800 further comprises an adjustment unit 830. The adjustment unit 830 is adapted to adjust the scheduling request interval and scheduling request resources, according to the received instruction.

The arrangement 800 may according to some embodiments further comprise a processing unit 850. The processing unit 850 may be represented by e.g. a Central Processing Unit (CPU), a processor, a microprocessor, or other processing logic that may interpret and execute instructions. The processing unit 850 may perform all data processing functions for inputting, outputting, and processing of data including data buffering and device control functions, such as call processing control, user interface control, or the like.

It is to be noted that the described units 810-850 comprised within the arrangement 800 may be regarded as separate logical entities, but not with necessity as separate physical entities. Any, some or all of the units 810-850 may be comprised or co-arranged within the same physical unit. However, in order to facilitate the understanding of the functionality of the arrangement 800, the comprised units 810-850 are illustrated as separate units in FIG. 8.

Thus the sender 810 and e.g. the receiver 820 may, according to some embodiments, be comprised within one physical unit, a transceiver, which may comprise a transmitter circuit and a receiver circuit, which respectively transmits outgoing radio frequency signals and receives incoming radio frequency signals via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the User Equipment 120

The method steps 701-706 in the user equipment 120 may be implemented through one or more processor units 850 in the user equipment 120, together with computer program code for performing the functions of the present method steps 701-706. Thus a computer program product, comprising instructions for performing the method steps 701-706 in the user equipment 120 may assist the base station 110 in allocating scheduling request resources to the user equipment 120.

The computer program product mentioned above may be provided for instance in the form of a data carrier carrying computer program code for performing the method steps according to the present solution when being loaded into the processor unit 850. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the user equipment 120 remotely, e.g. over an Internet or an intranet connection.

Further, a computer program product comprising instructions for performing at least some of the method steps 701-706 may be used for implementing the previously described method in the user equipment 120 for assisting the base station 110 in allocating scheduling request resources to the user equipment 120, when the computer program product is run on the processing unit 850 comprised within the user equipment 120.

The terminology used in the detailed description of the particular exemplary embodiments illustrated in the accompanying drawings is not intended to be limiting of the present methods and arrangements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. Method in a base station for allocating scheduling request resources to a user equipment served by the base station, the base station and the user equipment are comprised within a wireless communication system, the method comprising the steps of:

receiving a bearer setup message from the user equipment, sending, to the user equipment, a first instruction identifying a first scheduling request interval, to be used by the user equipment, wherein the scheduling request interval defines a period of time between adjacent scheduling request resources, and the scheduling request resource identifies moments in time allocated to the user equipment for sending a scheduling request to the base station;

receiving a scheduling request from the user equipment, based on the first scheduling request interval;

estimating the moment of time when data was generated at the user equipment, based on the received scheduling request, estimating a periodicity of data generation at the user equipment, determining a second scheduling request interval to be used by the user equipment, based on the estimated periodicity of data generation at the user equipment, determining a scheduling request resource to be allocated to the user equipment, based on the estimated moment of time when data was generated at the user equipment, and sending, to the user equipment, a second instruction comprising the determined second scheduling request interval and scheduling request resource, in order to adjust the scheduling request resources of the user equipment.

2. Method according to claim 1, wherein the user equipment is used for a service comprising different service states, and wherein the method comprises the step of:

detecting a service state change of a service requested by the user equipment, and wherein the step of determining a second scheduling request interval to be used by the user equipment is based also on the detected service state.

3. Method according to claim 1, wherein the step of estimating the periodicity of data generation at the user equipment is based on a combination of the received scheduling request, received data and bearer setup signaling received from the user equipment.

4. Method according to claim 1, comprising the further step of:

establishing a period of time, for which the first scheduling request interval is to be used by the user equipment, and wherein the first instruction to be sent to the user equipment further identifies the established period of time.

5. Method according to claim 2, wherein the step of determining, the second scheduling request interval to be used by the user equipment comprises identifying which service the user equipment requests, and determining the second scheduling request interval based on that identified service.

6. Method according to claim 2, wherein the service states comprises a talk state and a silent state, and wherein the second scheduling request interval is determined to be longer in response to talk state and shorter in response to silent state.

7. Method according to claim 1, wherein the first scheduling request interval, to be used by the user equipment is shorter than the second scheduling request interval.

8. Arrangement in a base station for allocating scheduling request resources to a user equipment served by the base station, the base station and the user equipment are comprised within a wireless communication system, the arrangement comprising:

a receiver, adapted to receive a bearer setup message and a scheduling request from the user equipment, a first estimating unit, adapted to estimate the moment of time when data was generated at the user equipment, based on the received scheduling request, a second estimating unit, adapted to estimate a periodicity of data generation at the user equipment, a first determining unit, adapted to determine a scheduling request interval to be used by the user equipment, based on the estimated periodicity of data generation at the user equipment, wherein the scheduling request interval defines a period of time between adjacent scheduling request resources and the scheduling request resource identifies moments in time allocated to the user equipment for sending a scheduling request to the base station, a second determining unit, adapted to determine a scheduling request resource to be allocated to the user equipment, based on the estimated moment of time when data was generated at the user equipment, and a sending unit, adapted to send an instruction indicating the determined scheduling request interval and scheduling request resource to the user equipment, in order to adjust the scheduling request resources of the user equipment.

9. Method in a user equipment for assisting a base station in allocating scheduling request resources to the user equipment, the base station and the user equipment are comprised within a wireless communication system, the method comprising the steps of:

sending a bearer setup message to the base station, receiving a first instruction identifying a first scheduling request interval from the base station, wherein the scheduling request interval defines a period of time between adjacent scheduling request resources, and the scheduling request resource identifies moments in time allocated to the user equipment for sending a scheduling request to the base station, adjusting the scheduling request interval, according to the received first instruction, sending a scheduling request to the base station at the adjusted first scheduling request interval, receiving, a second instruction identifying a second scheduling request interval and scheduling request resource, in order to adjust the scheduling request interval and scheduling request resources of the user equipment, and adjusting the scheduling request interval and scheduling request resources, according to the received second instruction.

10. Method according to claim 9, wherein the first scheduling request interval received from the base station, is used only for a certain period of time.

11. Method according to claim 10, wherein the certain period of time for which the first scheduling request interval is to be used by the user equipment is received in a communication from the base station.

12. Arrangement in a user equipment for assisting a base station in allocating scheduling request resources to the user equipment, the base station and the user equipment are comprised within a wireless communication system, the arrangement comprising:

a sender, adapted to send a bearer setup message to the base station, a receiver, adapted to receive an instruction identifying a scheduling request interval and scheduling request resource from the base station, wherein the scheduling request interval defines a period of time between adjacent scheduling request resources, and the scheduling request resource identifies moments in time allocated to the user equipment for sending a scheduling request to the base station; and an adjustment unit, adapted to adjust the scheduling request interval and scheduling request resources, according to the received instruction.

* * * * *